(12) United States Patent
Zeeb

(10) Patent No.: US 10,350,535 B2
(45) Date of Patent: Jul. 16, 2019

(54) SPRAY ARRANGEMENT AND METHOD FOR OPERATING A SPRAY ARRANGEMENT

(71) Applicant: Thomas Zeeb, Koengen (DE)

(72) Inventor: Thomas Zeeb, Koengen (DE)

(73) Assignee: LECHLER GMBH, Metzingen (DE)

( * ) Notice: Subject to any disclaimer, the term of this patent is extended or adjusted under 35 U.S.C. 154(b) by 226 days.

(21) Appl. No.: 15/073,174

(22) Filed: Mar. 17, 2016

(65) Prior Publication Data

US 2016/0296875 A1 Oct. 13, 2016

(30) Foreign Application Priority Data

Apr. 13, 2015 (DE) .................. 10 2015 206 548

(51) Int. Cl.
*B01D 47/06* (2006.01)
*C10K 1/06* (2006.01)
(Continued)

(52) U.S. Cl.
CPC ............. *B01D 47/06* (2013.01); *B01D 53/18* (2013.01); *B05B 9/0423* (2013.01); *B05B 15/58* (2018.02);
(Continued)

(58) Field of Classification Search
CPC .. B01D 47/06; B01D 53/18; B01D 2259/124; B05B 15/58; B05B 9/0423; B05B 15/55;
(Continued)

(56) References Cited

U.S. PATENT DOCUMENTS 5,827,566 A * 10/1998 Epple ...................... B27N 1/02
427/8
7,073,734 B2 * 7/2006 Dorendorf ............ B05B 7/0416
239/398
(Continued)

FOREIGN PATENT DOCUMENTS

AT 510 419 A4 4/2012
CN 2072865 U 3/1991
(Continued)

OTHER PUBLICATIONS

EPO machine translation of Vequaud WO 2004/071157 published Aug. 26, 2004.*
(Continued)

*Primary Examiner* — Stephen Hobson
(74) *Attorney, Agent, or Firm* — Flynn Thiel, P.C.

(57) ABSTRACT

The invention relates to a spray arrangement having at least one return flow nozzle for injecting liquid into a process environment, having a storage tank for the liquid to be injected, at least one return flow nozzle, at least one feed line from the storage tank to the at least one return flow nozzle, at least one pump in the feed line, at least one return line from the return flow nozzle to the storage tank and at least one regulating valve for regulating a liquid quantity injected by the at least one return flow nozzle, wherein at least one further nozzle is provided, which is connected to the feed line by means of a controllable valve for enabling and shutting off a liquid feed.

7 Claims, 3 Drawing Sheets

(51) Int. Cl.
  *B01D 53/18* (2006.01)
  *B05B 9/04* (2006.01)
  *B05B 15/58* (2018.01)
  *B05B 1/30* (2006.01)
  *B05B 1/34* (2006.01)
  *B05B 15/55* (2018.01)

(52) U.S. Cl.
  CPC .......... *C10K 1/06* (2013.01); *B01D 2259/124* (2013.01); *B05B 1/30* (2013.01); *B05B 1/3093* (2013.01); *B05B 1/3426* (2013.01); *B05B 15/55* (2018.02)

(58) Field of Classification Search
  CPC ....... B05B 1/30; B05B 1/3426; B05B 1/3093; C10K 1/06
  See application file for complete search history.

(56) References Cited

U.S. PATENT DOCUMENTS

| | | | |
|---|---|---|---|
| 8,453,945 | B2 | 6/2013 | Wurz |
| 8,985,478 | B2* | 3/2015 | Wurz .................... B05B 7/0458 239/112 |
| 2009/0121038 | A1* | 5/2009 | Wurz .................... B05B 7/0458 239/8 |
| 2013/0161408 | A1 | 6/2013 | Wurz |
| 2014/0124537 | A1* | 5/2014 | Urquhart ................ B05B 15/55 222/148 |

FOREIGN PATENT DOCUMENTS

| | | | |
|---|---|---|---|
| CN | 2275712 | Y | 3/1998 |
| CN | 2584275 | Y | 11/2003 |
| CN | 101722123 | A | 6/2010 |
| CN | 203030144 | U | 7/2013 |
| DE | 28 45 593 | A1 | 4/1980 |
| DE | 195 06 353 | A1 | 8/1996 |
| DE | 10 2005 037 991 | A1 | 2/2007 |
| EP | 1 294 228 | B1 | 3/2003 |
| JP | H 10-128163 | | 5/1998 |
| WO | WO 96/14139 | A1 | 5/1996 |
| WO | WO 01/95714 | A1 | 12/2001 |
| WO | WO 2004/071157 | * | 8/2004 |
| WO | WO 2004/071157 | A2 | 8/2004 |
| WO | WO 2013/011089 | A1 | 1/2013 |

OTHER PUBLICATIONS

Office Action of German Patent Office issued in Application No. 10 2015 206 548.0 dated Feb. 19, 2016 (5 pages).

Search Report of European Patent Office issued in Application No. 16163704 dated Sep. 13, 2016 with English translation of category of cited documents (8 pages).

Office Action of Chinese Patent Office issued in Application No. 201610226366.X dated Sep. 5, 2017 (7 pages).

* cited by examiner

SPRAY ARRANGEMENT AND METHOD FOR OPERATING A SPRAY ARRANGEMENT

CROSS-REFERENCE TO RELATED APPLICATIONS

This claims the priority from German Patent Application No. 10 2015 206 548.0, filed on Apr. 13, 2015, the disclosure of which is hereby incorporated by reference in its entirety into this application.

FIELD, BACKGROUND AND SUMMARY OF THE INVENTION

The invention relates to a spray arrangement having at least one return flow nozzle for injecting liquid into a process environment, having a storage tank for the liquid to be injected, at least one return flow nozzle, at least one feed line from the storage tank to the at least one return flow nozzle, at least one pump in the feed line, at least one return line from the return flow nozzle to the storage tank and at least one regulating valve for regulating a liquid quantity injected by the at least one return flow nozzle.

Spray arrangements having return flow nozzles have the advantage that the liquid quantity injected can be regulated in a simple manner via the quantity of liquid flowing in the return line. Such spray arrangements are used for gas scrubbing or for gas cooling, for example, in which case the spray arrangement injects liquid into a process chamber, e.g. into a gas cooler, by means of a plurality of return flow nozzles. In order to avoid disadvantageously affecting sections of the plant which follow on downstream from the process chamber or the gas cooler, the liquid quantity injected must be set in such a way that the liquid injected is completely vaporized at the outlet of the gas cooler. This requires regulation of the liquid quantity injected. The disadvantage with spray arrangements having return flow nozzles is that, in the regulated range, more liquid must be supplied in the feed line than is injected by the return flow nozzle. Only when the maximum possible amount of liquid is injected, i.e. when the return line is closed, does the quantity of liquid fed in correspond to the quantity of liquid injected. If less than the maximum possible liquid is injected, it is even necessary to feed in more liquid via the feed line than corresponds to the maximum possible liquid quantity injected. The volume flow ratio of the quantity of water to be delivered by the pump in the case of maximum injection to the quantity of water to be delivered by the pump at minimum injection is normally in a range of from 1.3 to 1.7. For the design of the return flow nozzle system, this means that the delivery pump has to be designed for a volume flow which is 30% to 70% higher than is required for maximum injection, that the electric components for safeguarding and switching and the cable cross sections for supplying the motors of the delivery pumps have to be configured for the power required at the large quantity of water to be delivered at minimum injection, and that the pipes for the feed line and the return line have to be designed for a volume flow 30% to 70% higher than is required for maximum injection.

By means of the invention, the intention is to improve a spray arrangement having at least one return flow nozzle and to improve a method for operating a spray arrangement of this kind.

According to the invention, a spray arrangement having at least one return flow nozzle for injecting liquid into a process environment is provided for this purpose, said spray arrangement having a storage tank for the liquid to be injected, at least one return flow nozzle, at least one feed line from the storage tank to the at least one return flow nozzle, at least one pump in the feed line, at least one return line from the return flow nozzle to the storage tank and at least one regulating valve for regulating a liquid quantity injected by the at least one return flow nozzle, wherein at least one further nozzle is provided, which is connected to the feed line by means of a controllable valve for enabling and shutting off a liquid feed.

Since, in addition to the at least one return flow nozzle, at least one further nozzle is provided, which can be connected or disconnected by means of a controllable valve, it is possible to design the pumps and the pipes and the electrical equipment of the spray arrangement exclusively for the quantity of water injected at maximum injection. This is because maximum injection is achieved not by means of the at least one return flow nozzle alone but by means of the return flow nozzle operated in a closed circuit and the at least one further nozzle connected. If the return flow nozzle is then operated in the regulated range, i.e. at less than the maximum possible injection, the liquid quantity to be delivered in the feed line by the pump does admittedly increase. However, since the maximum injection of the return flow nozzle is lower than with conventional spray arrangements by the amount of injection effected by the further nozzle, the liquid quantity to be delivered in the feed line in the regulated range does not exceed the maximum required injection of the overall spray arrangement. The pumps, pipes and the electrical equipment of the spray arrangement according to the invention can thus be designed for the maximum required injection of the overall spray arrangement. Compared with conventional spray arrangements which use only regulatable return flow nozzles, this allows considerable savings.

Moreover, the combination of at least one return flow nozzle operated from maximum to minimum injection over its full regulated range with at least one further, connectable nozzle enhances the regulating ratio of the overall spray arrangement. Once the at least one return flow nozzle has reached its maximum injection, i.e. its return is closed, one or a plurality of cascaded further nozzles can be connected if more liquid is to be injected. Since fewer regulated return flow nozzles are required than with conventional systems, the liquid quantity to be delivered for minimum injection is reduced. The start-up behaviour of the spray arrangement is thereby likewise improved.

As a development of the invention, the at least one further nozzle is designed as a single-substance nozzle.

By means of a single-substance nozzle, a similar or even identical spray behaviour to that with return flow nozzles can be achieved. For example, the single-substance nozzles are designed as return flow nozzles but are not connected to the return line. In this way, an identical spray pattern can be achieved without problems in the case of the return flow nozzles and the further nozzles.

As a development of the invention, the at least one further nozzle is provided with an air-cleaning device.

It has proven advantageous to air-clean the at least one further nozzle in the disconnected state, e.g. by means of compressed air. Deposits in the further nozzle in the disconnected state are thereby avoided. More specifically, an air-cleaning device eliminates manual emptying of the nozzle, e.g. by removal of the spray lance and subsequent air-cleaning.

As a development of the invention, a compressed air source is provided, which can be connected to the at least one further nozzle by means of a switchable valve. In this way, the further nozzles can be air-cleaned without problems. As a result, no liquid remains within the further nozzles in the disconnected state thereof, thus eliminating the risk of encrustation.

The problem underlying the invention is also solved by a method for operating a spray arrangement according to the invention, in which liquid is injected into the process environment exclusively via the at least one return flow nozzle in a first operating range, and in which liquid is injected both by means of the at least one return flow nozzle and also by means of the at least one further nozzle in a second operating range.

Thus, since one or more further nozzles are connected in order to increase the injected liquid quantity in steps, the pumps, the pipe cross sections and the electrical equipment of the spray arrangement according to the invention have to be designed only for the liquid quantity which is required for maximum injection by the overall spray arrangement. Compared with conventional spray arrangements, which operate exclusively with return flow nozzles, it is thereby possible to achieve considerable savings.

As a development of the invention, regulation of a first liquid quantity in the first operating range in accordance with a predetermined liquid quantity to be injected is provided.

In a first operating range, which lies between a minimum possible injection and a maximum injection achievable by means of the at least one return flow nozzle, the liquid quantity injected can be regulated by means of the return flow nozzles.

As a development of the invention, connection, unregulated operation and/or disconnection of the at least one further nozzle in the second operating range is provided.

The second operating range lies between the maximum injection which can be achieved by means of the at least one return flow nozzle and the maximum injection of the overall spray arrangement. In this second operating range, at least one further nozzle or a plurality of further nozzles is connected to achieve a predetermined liquid quantity to be injected. Connection is advantageously performed in a cascaded manner in order to achieve a stepwise increase or decrease in the overall liquid quantity injected. A significant advantage here over conventional spray arrangements which operate exclusively with return flow nozzles is that the further nozzles are simply connected and then operated or disconnected in an unregulated manner. The liquid quantity fed to the further nozzles is thus injected completely into the process environment. If finer graduation of the liquid quantity injected is required in the second operating range than is obtained by connecting or disconnecting the further nozzles, regulation of the liquid quantity injected is possible by means of the return flow nozzles in the second operating range as well. As a liquid quantity injected is ramped up, for example, the return flow nozzle is first of all adjusted to its maximum possible injection by closing the return of the return flow nozzle. At least one further nozzle is then connected, resulting in a stepwise increase in the liquid quantity injected by the overall spray arrangement. If the liquid quantity injected is then to be regulated, this can be accomplished by a regulating mode of the return flow nozzle.

As a development of the invention, a plurality of further nozzles is provided, and, in the second operating range, connection, unregulated operation and/or disconnection of a number of further nozzles takes place in accordance with a predetermined liquid quantity to be injected.

In the case of a plurality of further nozzles, these can be connected or disconnected in cascade-fashion in order to achieve a predetermined liquid quantity to be injected.

As a development of the invention, regulation of a liquid quantity injected by means of regulation of the at least one return flow nozzle is provided in the second operating range.

In this way, regulation of the liquid quantity injected can also be accomplished in the second operating range. This is preferred if graduation through connection or disconnection of the at least one further nozzle provides graduation that is too coarse for satisfactory operation of the spray arrangement.

As a development of the invention, air-cleaning of the at least one further nozzle after disconnection is provided.

In this way, encrustations or blockages of the at least one further nozzle can be prevented when the latter is disconnected and thus not in operation.

BRIEF DESCRIPTION OF THE DRAWINGS

Further features and advantages of the invention will become apparent from the claims and the following description of a preferred embodiment of the invention in conjunction with the drawings, in which:

DETAILED DESCRIPTION

Figure 1:
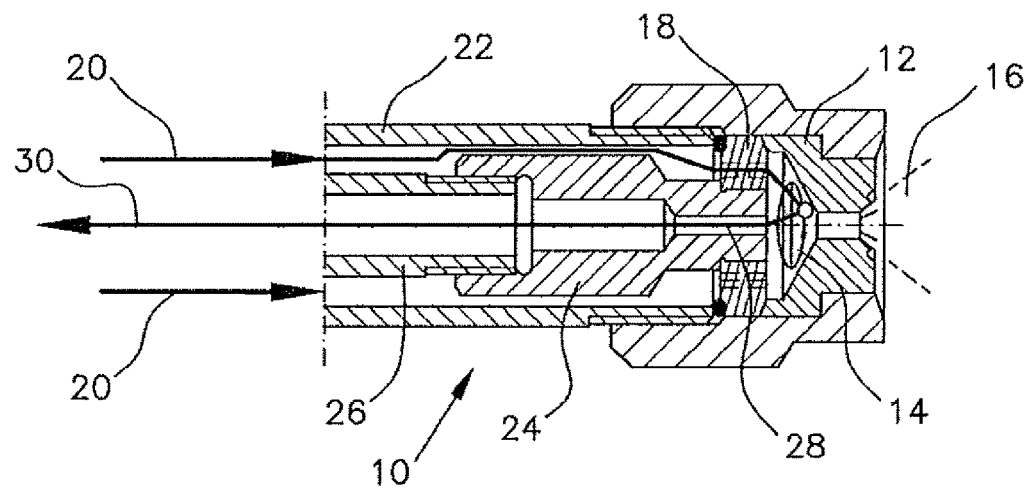
FIG. 1 shows a section through a return flow nozzle in a first operating state.

The illustration in FIG. 1 shows a return flow nozzle 10 in section and serves to explain the mode of operation of the return flow nozzle 10. The return flow nozzle 10 has a housing with a mouthpiece 12, which has a swirl chamber 14 and an outlet opening, from which a spray jet 16 emerges during operation. The liquid to be sprayed moves in a circle within the swirl chamber, this being indicated by a circular arrow in FIG. 1. The liquid within the swirl chamber is fed in via a swirl insert 18, which imparts to the liquid a rotation about a central longitudinal axis of the return flow nozzle 10. Liquid is fed in in the direction of arrows 20 via an inflow line 22. Arranged concentrically within the inflow line 22 is a return connection 24, which is connected to a return line 26, on the one hand, and to the nozzle housing, more specifically to the swirl insert 18, on the other hand. The return connection 24 has a return bore 28, which is connected to the swirl chamber 14, on the one hand, and to the return line 26, on the other hand. Liquid can escape from the swirl chamber 14 via the return bore 28 and the return line 26, this being indicated by an arrow 30.

A regulatable valve (not shown) is arranged in the return line 26. Depending on how far this valve in the return line 26 is open, more or less liquid will flow back into the return line 26 from the swirl chamber 14 in the direction of arrow 30. The liquid quantity sprayed via the spray jet 16 from the return flow nozzle 10 can be regulated by means of the position of the valve, i.e. by means of the quantity of liquid removed from the swirl chamber 14 via the return bore 28.

Figure 2:
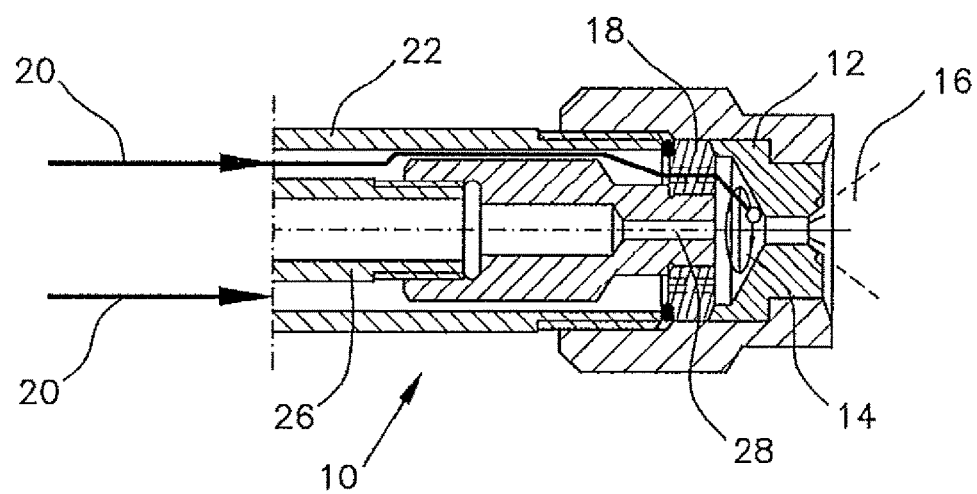
FIG. 2 shows a section through a return flow nozzle in a second operating state.

FIG. 2 shows the return flow nozzle 10 in a second operating state. In this second operating state, the valve in the return line 26 and thus the return line 26 itself are fully closed. As a result, no liquid can escape from the swirl chamber 14 via the return bore 28. All the liquid which is introduced into the return line 22 in accordance with the arrows 20 and flows via the swirl insert 18 into the swirl chamber 14 in the mouthpiece 12 is thus discharged in the form of the spray jet 16. The operating state in FIG. 2 represents the state in which the maximum possible liquid quantity is sprayed via the spray jet 16 by means of the return flow nozzle 10.

In the operating state in FIG. 1, in contrast, the liquid quantity discharged via the spray jet 16 by the return flow nozzle 10 can be regulated. In the case of conventional return flow nozzles 10, a regulating ratio is about 10:1. The maximum possible liquid quantity sprayed in the operating state in FIG. 2 is thus about ten times the minimum possible liquid quantity sprayed in the state in FIG. 1.

It is a characteristic of return flow nozzles that, below the maximum injection, i.e. in the operating state in FIG. 1, the liquid quantity to be delivered by the pump, that is to say which is delivered in the inflow line 22 in accordance with the arrows 20 in FIG. 1, increases all the more, the smaller the liquid quantity discharged via the spray jet 16. This is the case because the valve in the return line 26 has to be opened in order to reduce the liquid quantity discharged via the spray jet 16. As a result, liquid flows back into the return line 26 in accordance with the case 30, with the result that the liquid quantity to be delivered by the pump increases if a well-formed spray jet 16 is to be produced at the same time. However, this effect during the operation of return flow nozzles 10 has the result that a pump must deliver more liquid into the inflow line 22 in the operating state in FIG. 1 than in the operating state of the maximum possible sprayed liquid quantity in the state in FIG. 2. The volume flow ratio of the liquid quantity to be delivered by the pump at maximum injection, i.e. in the state in FIG. 2, to the liquid quantity to be delivered by the pump at minimum injection, i.e. in the operating state in FIG. 1, is in the range of from 1.3 to 1.7 in the case of conventional return flow nozzles. For the configuration of a spray arrangement with the return flow nozzle 10, this means that the pump must be configured for a volume flow that is 30% to 70% higher than is required for injection of the maximum possible liquid quantity. This also has the result that the pump motor and the electric components for operating the pump as well as the pipes have to be configured for the liquid flow which is 30% to 70% higher.

During the operation of spray arrangements with return flow nozzles 10, this results in relatively high costs for the pumps, the electrical equipment thereof and also the pipes to the return flow nozzles. Spray arrangements having return flow nozzles are used in large industrial plants, e.g. cement works, for example. For this purpose, the return flow nozzles must sometimes be arranged in towers, and therefore the pipes for supplying these return flow nozzles are also of considerable length. As a result, the costs for supplying these pipes are significant.

Figure 3:
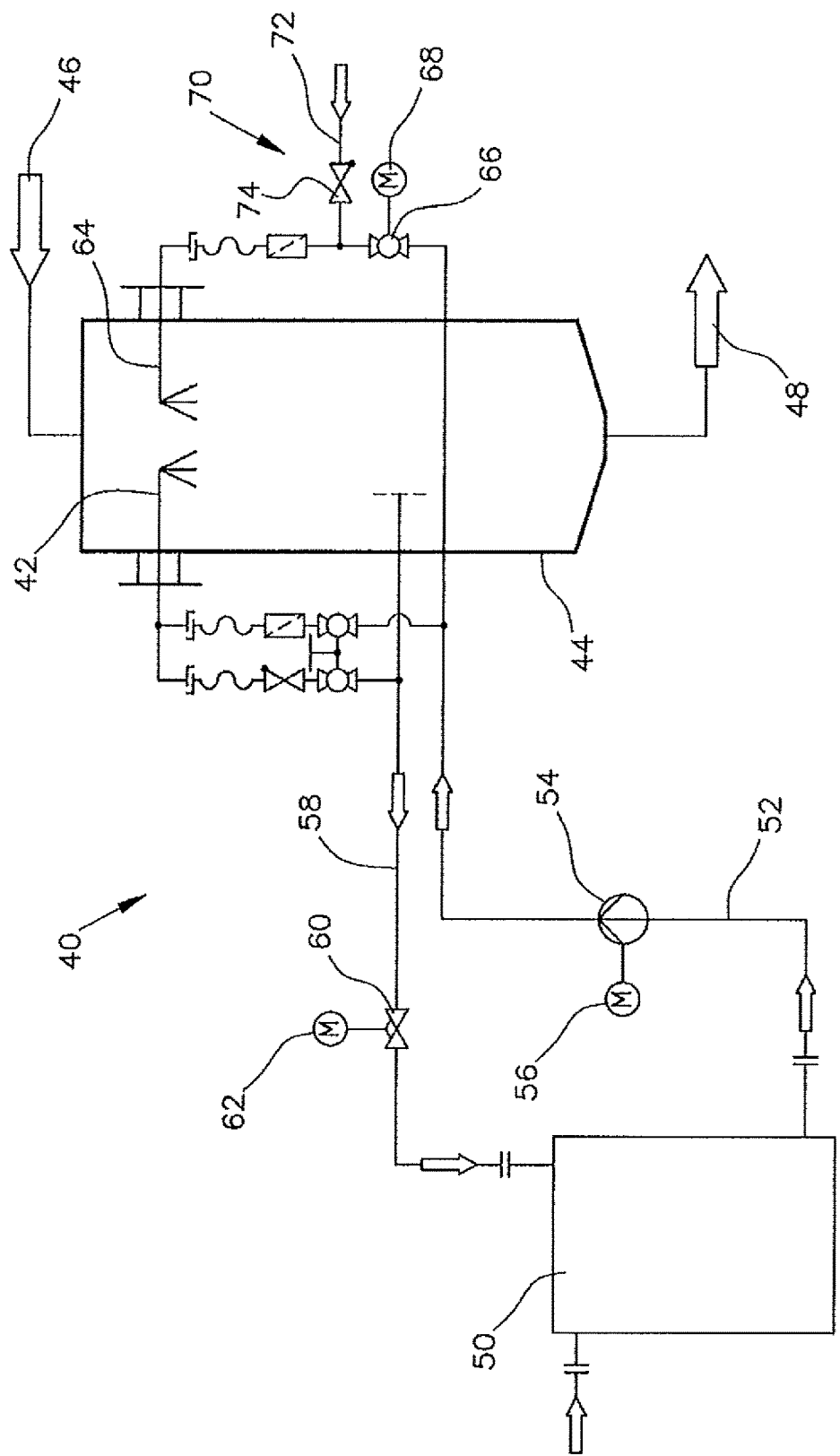
FIG. 3 shows a schematic illustration of a spray arrangement according to the invention.

FIG. 3 shows a spray arrangement 40 according to the invention in schematic representation. The spray arrangement 40 has a plurality of return flow nozzles 42, which spray liquid into a process chamber within a gas cooler 44, wherein only one return flow nozzle 42 is shown for the sake of clarity. Hot gas is introduced into the gas cooler 44 at the top in accordance with an arrow 46, and cooled gas is discharged again at the lower end of the gas cooler 44 in accordance with an arrow 48. In order to protect the other system components (not shown in FIG. 3) downstream of the gas cooler 44, it must be ensured that the liquid quantity injected by means of the return flow nozzles 42 is completely vaporized at the lower end of the gas cooler 44. For this reason, the return flow nozzles 42 are regulatable, as has been explained with reference to FIGS. 1 and 2. The return flow nozzles 42 are supplied with liquid to be sprayed from a storage tank 50 via a feed line 52. Arranged in the feed line is a liquid pump 54, which is driven by means of an electric motor 56. The return flow nozzles 42 are connected to a return line 58, which leads back to the storage tank 50. Arranged in the return line 58 is a regulating valve 60, by means of which a volume flow in the return line 58 and hence the liquid quantity discharged from the return flow nozzles 42 can be regulated. A control unit for controlling an actuating motor 62 of the regulating valve 60 is not shown for the sake of clarity.

The feed line 52 is connected to a plurality of further nozzles 64, which likewise injected liquid into the interior of the gas cooler 44, wherein only one further nozzle 64 is shown for the sake of clarity. Liquid supply to the further nozzles 64 can be enabled or shut off by means of a controllable valve 66. A control unit for controlling a drive motor 68 of the controllable valve 66 is likewise not shown for the sake of clarity.

The further nozzles 64 are not connected to the return line 58. Admittedly, the further nozzles 64 can likewise be designed as return flow nozzles, that is to say in the same way as return flow nozzle 10 in FIG. 1 and FIG. 2. However, the further nozzles 64 are not connected to the return line 58 in any case, and therefore the further nozzles 64 can only ever be operated at the operating point in FIG. 2, i.e. with the maximum possible liquid quantity discharged via the spray jet 16, even if they are designed as return flow nozzles 10.

For reasons of cost, however, it is advantageous if the further nozzles 64 are designed as non-regulatable spray nozzles and thus not as return flow nozzles.

Since the further spray nozzles 64 can be connected or disconnected by means of the controllable valve 66, a liquid quantity injected into the gas cooler 44 can be increased beyond the liquid quantity injected by the return flow nozzles 42. However, since the further nozzles 64 are only connected when a higher liquid quantity is to be injected, i.e. when the return flow nozzles 42 can inject at the maximum rates, the pump 54 and, consequently, also the drive motor 56 of the pump 54 no longer need to deliver more liquid than the maximum amount to be injected into the gas cooler 44. This is because, even if less than the maximum required liquid quantity is to be injected into the gas cooler 44, the regulating valve 60 in the return line 58 is already closed and the return flow nozzles 42 are operated at the maximum possible injection rate thereof, i.e. in the operating state in FIG. 2. In a first operating range, which extends from the minimum possible injection by the return flow nozzles 42 to the maximum possible injection by the return flow nozzles 42, the regulating valve 60 is therefore at least partially open and liquid flows back via the return line 58. In a second operating range, which extends from the maximum possible injection by the return flow nozzles 42 to the maximum injection by means of the return flow nozzles 42 and of the further nozzles 64 into the gas cooler 44, the regulating valve 60 is, in contrast, preferably closed and no liquid flows back into the storage tank 50 via the return line 58. Only if there is to be regulation of the liquid quantity injected in the second operating range is the regulating valve 60 at least partially opened and actuated in accordance with regulation.

In the first operating range, the controllable valve 66 is thus closed and the nozzles 64 are not in operation. In order to avoid encrustations and blockages in the further nozzles 64 in this first operating range, an air-cleaning device 70 is provided. The air-cleaning device 70 has a supply line 72 for compressed air, which can be opened or shut off by means of a switchable valve 74. In the opened state, compressed air is introduced into the supply line leading to the further nozzles 64 upstream of the controllable valve 66. Liquid residues in the feed line and especially in the nozzles 64 can thereby be removed.

The operation of the spray arrangement 40 according to the invention will be explained further in comparison with a conventional spray arrangement with reference to the diagram in FIG. 4. In the diagram in FIG. 4, a volume flow in the feed line 52 is plotted against a volume flow injected into the gas cooler 44. If a conventional spray arrangement is used, which has only regulated return flow nozzles, it can be seen from the solid line marked with crosses that a liquid quantity to be delivered by the pump 54 in the feed line 52 is lowest when the maximum possible volume flow is injected. If the return flow nozzles are regulated and thus liquid flows back into the storage tank 50 via the return line 58, on the other hand, the pump 54 must deliver more liquid even though less liquid is injected into the gas cooler 44. It should be noted here that the diagram in FIG. 4 serves only for illustration, and the solid line marked with crosses in FIG. 4 represents only an imaginary curve that would be obtained if the spray arrangement 40 in FIG. 3 were provided exclusively with return flow nozzles 42.

Figure 4:
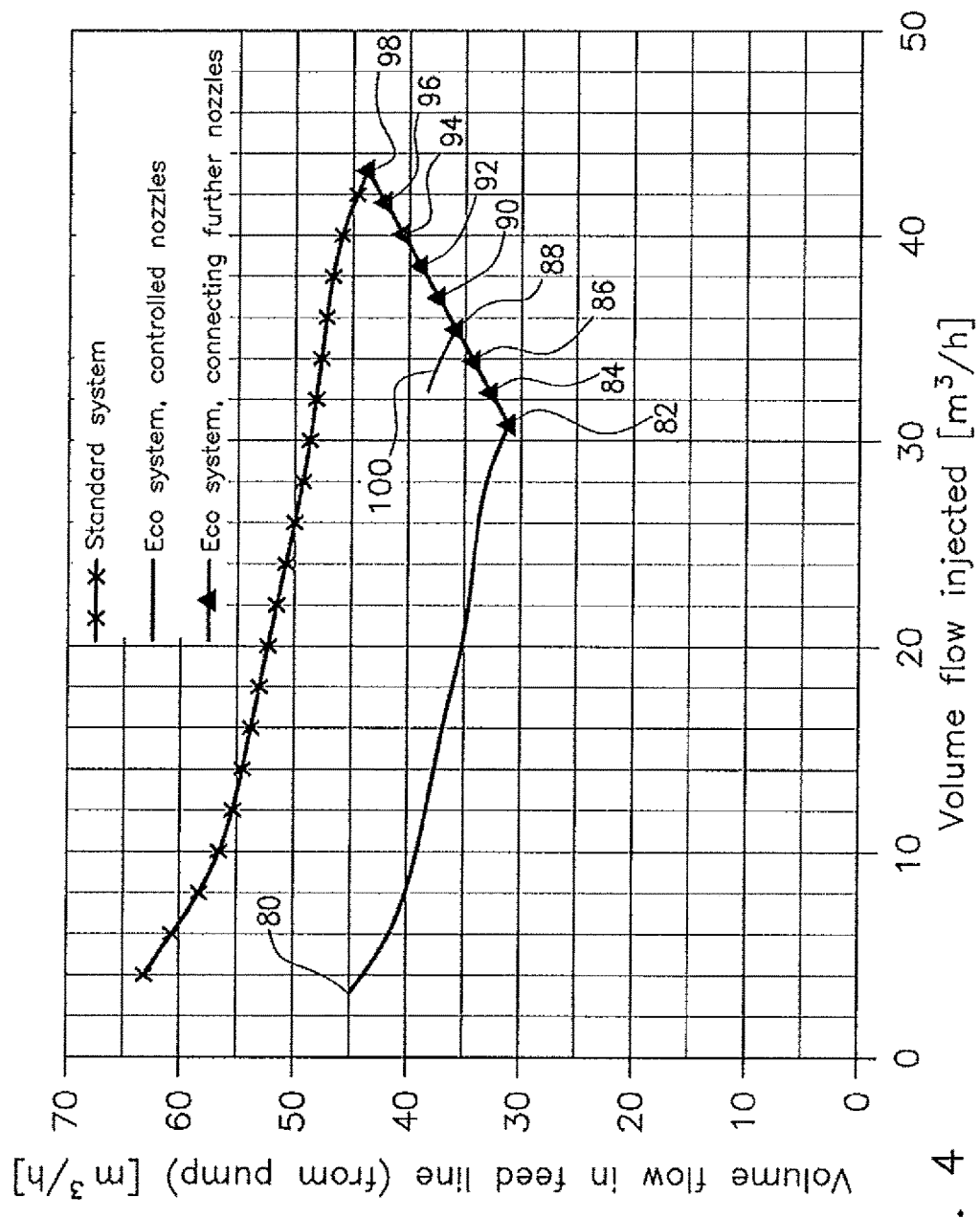
FIG. 4 shows a diagram to illustrate a method for operating the spray arrangement according to the invention in FIG. 3.

In contrast, the solid line partially marked by triangles in FIG. 4 represents the volume flow actually delivered in the inflow line 52 against the volume flow injected into the gas cooler 44. From a starting point 80, at which the injection of liquid into the gas cooler 44 via the return flow nozzles 42 begins, the volume flow injected increases up to a point 82. Point 82 represents the maximum possible injection by the return flow nozzles 42. A maximum volume flow of about 31 $m^3$ per hour can thus be injected into the gas cooler 44 by means of the return flow nozzles 42. Between points 80 and 82, the return flow nozzles 42 exhibit the typical behaviour of return flow nozzles, namely that the volume flow to be delivered through the feed line 52 by the pump 54 is greater than the volume flow injected into the gas cooler 44 and, in particular, the volume flow to be delivered through the feed line 52 by means of the pump 54 is higher, the smaller the liquid quantity injected into the gas cooler 44 by means of the return flow nozzles 42.

If a larger injected volume flow is required from point 82, a plurality of further nozzles 64 is connected in succession. In the illustration in FIG. 3, just one further nozzle 64 and just one switchable valve 66 are shown. In actual fact, there is a plurality of further nozzles 64, e.g. nine further nozzles 64, which can be connected separately by means of separate controllable valves 66. Thus, at point 82, a first further nozzle 64 can be connected, as a result of which the volume flow injected then increases up to a point 84. If further nozzles 64 are then connected in succession in the manner of a cascade, the volume flow injected rises via points 86, 88, 90, 92, 94, 96 to a point 98, at which the maximum volume flow achievable by means of the spray arrangement 40 is injected. In the diagram in FIG. 4, a volume flow of about 43 $m^3$ per hour is injected into the gas cooler 44. This volume flow is achieved by operating the return flow nozzles 42 with maximum injection in each case and additionally operating nine further nozzles 64. In the diagram in FIG. 4, points 82 to 98 lie on a straight line. The additional volume flow injected by connecting further nozzles 64 must be delivered by means of the feed line 52 and the pump 54.

Thus, at point 98, the maximum possible volume flow injected by means of the spray arrangement 40 according to the invention is at the same level as a volume flow that could also be injected by means of a standard system using only return flow nozzles, as shown by the solid line marked by crosses. However, it is immediately apparent from FIG. 4 that, with the exception of point 98, the volume flow to be delivered in the feed line 52 in the spray arrangement 40 according to the invention is significantly lower than in the standard system. More specifically, given an injected volume flow of 4 $m^3$ per hour with the spray arrangement according to the invention, only a volume flow of about 44 $m^3$ per hour has to be delivered by the feed line 52. In a standard system, which operates exclusively with regulatable return flow nozzles, on the other hand, about 62 $m^3$ per hour would have to be delivered in the feed line 52. Therefore, despite the fact that the same maximum possible volume flow of about 43 $m^3$ per hour can be injected with the spray arrangement 40 according to the invention, namely at point 98, the pump 54, the drive motor 56 of the pump 54 and also the pipe cross sections of the supply line 52 can be configured for the significantly smaller volume flow to be delivered in the feed line 52.

It is furthermore apparent from FIG. 4 that the minimum possible injection of the spray arrangement 40 according to the invention, namely at point 80, is less than in a standard system employing only return flow nozzles. At point 80, the volume flow injected is about 3 $m^3$ per hour. In contrast, the minimum possible volume flow injected in a standard system is 4 $m^3$ per hour. With the spray arrangement 40 according to the invention, it is thus possible to achieve a higher regulating ratio than with a standard system employing only return flow nozzles.

Between points 82 and 98, a volume flow injected by means of the return flow nozzles 42 and the further nozzles 64 is not regulated. As each further nozzle 64 is connected, the volume flow injected rises between in each case two points 82 to 98. With such high injected volume flows, regulation of the volume flow injected is generally no longer required, and therefore simply connecting the further nozzles 64 is sufficient, corresponding to the straight line between points 82 and 98. However, if regulation is necessary even at these high volume flows injected, the regulating mode of the return flow nozzles 42 can be resumed after the connection of one or some further nozzles 64, with the regulating valve 60 then being actuated. By way of example, the plot in FIG. 4 shows that, after point 88 is reached, i.e. after the connection of four further nozzles 64, the regulating valve 60 is opened and hence the return flow nozzles 42 are once again in the regulating mode. The volume flow injected then decreases again in accordance with the line 100 plotted in FIG. 4 and can then be regulated. During this process, the volume flow injected then varies along the line 100. It is, of course, also possible, even in the regulating mode, for further nozzles 64 then to be connected, and the volume flow injected would then vary along a line extending approximately parallel to line 100, although it would then start from point 92, for example.

The invention claimed is:

1. Method for operating a spray arrangement having at least one return flow nozzle for injecting liquid into a process environment, having a storage tank for the liquid to be injected, at least one feed line from the storage tank to the at least one return flow nozzle, at least one pump in the at least one feed line, at least one return line from the at least one return flow nozzle to the storage tank and at least one regulating valve for regulating a liquid quantity injected by the at least one return flow nozzle, at least one further nozzle connected to the at least one feed line by a controllable valve for enabling and shutting off a liquid feed, said controllable valve being controllable independent of said at least one regulating valve, wherein liquid is injected into the process environment exclusively via the at least one return flow nozzle in a first operating range, and liquid is injected both by the at least one return flow nozzle and also by the at least one further nozzle in a second operating range, wherein the at least one further nozzle is not connected to the at least one return line and is spaced from the at least one return line.

2. Method according to claim 1, including regulation of a first liquid quantity in the first operating range in accordance with a predetermined liquid quantity to be injected.

3. Method according to claim 1, including connection, unregulated operation and/or disconnection of the at least one further nozzle in the second operating range.

4. Method according to claim 3, including providing a plurality of further nozzles and connecting, operating unregulated and/or disconnecting a number of further nozzles in the second operating range in accordance with a predetermined liquid quantity to be injected.

5. Method according to claim 3, including regulation of a liquid quantity injected in the second operating range by regulation of the liquid quantity injected by the at least one return flow nozzle.

6. Method according to claim 1, including air-cleaning of the at least one further nozzle after disconnection.

7. Method for operating a spray arrangement having at least one return flow nozzle for injecting liquid into a process environment, having a storage tank for the liquid to be injected, at least one feed line from the storage tank to the at least one return flow nozzle, at least one pump in the at least one feed line, at least one return line from the at least one return flow nozzle to the storage tank and at least one regulating valve for regulating a liquid quantity injected by the at least one return flow nozzle, at least one further nozzle connected to the at least one feed line by a controllable valve for enabling and shutting off a liquid feed, said controllable valve being controllable independent of said at least one regulating valve, wherein liquid is injected into the process environment exclusively via the at least one return flow nozzle in a first operating range, and liquid is injected both by the at least one return flow nozzle and also by the at least one further nozzle in a second operating range, wherein the at least one further nozzle is not connected to the at least one return line and is separated from the at least one return line.

\* \* \* \* \*